United States Patent

[11] 3,631,949

[72] Inventors: Nikolai Dmitrievich Mazalov
Belvar Matrosa zheleznyaka, 31, korpus 3, kv. 57;
Nikolai Konstantinovich Dyachkov, Kadashevskaya naberezhnaya, 6/1, kv. 105;
Dmitry Trdatovich Gapoian, ulitsa Onezkskaya 31, kv. 110, all of Moscow, U.S.S.R.
[21] Appl. No. 869,763
[22] Filed Oct. 27, 1969
[45] Patented Jan. 4, 1972

[54] GEARBOX OF TRANSPORT VEHICLES WITH HYDRODYNAMIC RETARDER BRAKE
2 Claims, 1 Drawing Fig.
[52] U.S. Cl. .................................. 192/4 B, 192/3.34, 74/411.5
[51] Int. Cl. .................................................. F16h 57/10
[50] Field of Search ................................ 192/4 B, 12 A, 3.34

[56] References Cited
UNITED STATES PATENTS

| 2,787,170 | 4/1957 | Forster | 192/4 B X |
| 3,259,218 | 7/1966 | Black et al. | 192/4 B X |
| 3,319,746 | 5/1967 | Christenson et al. | 192/4 B |
| 3,326,339 | 6/1967 | Suri | 192/4 B |

FOREIGN PATENTS

| 482,380 | 9/1929 | Germany | 192/4 B |

*Primary Examiner*—Benjamin W. Wyche
*Attorney*—Waters, Roditi, Schwartz & Nissen ABSTRACT: A gearbox for transport vehicles comprises a hydrodynamic retarder brake with a rotor which is mounted on the input shaft with provision for free rotation. The rotor is connected with the output shaft by a system of gears, one of which is installed on the input shaft and is connected with the rotor so that it can rotate jointly with the rotor relative to the input shaft.

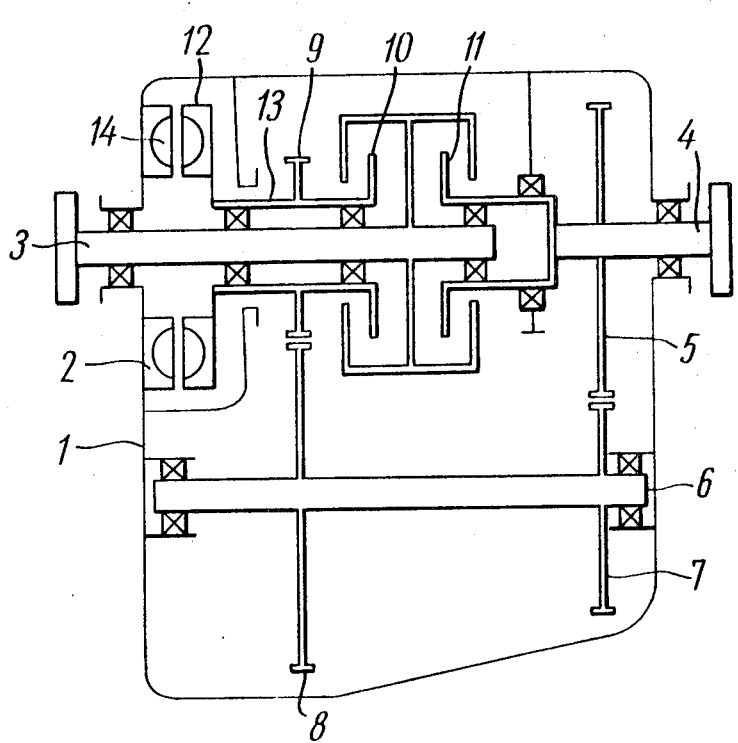

GEARBOX OF TRANSPORT VEHICLES WITH HYDRODYNAMIC RETARDER BRAKE

The present invention relates to gearboxes of transport vehicles and more specifically to gearboxes with a hydrodynamic retarder brake.

Known in the art is a gearbox with a retarder brake comprising a rotor mounted on the gearbox output shaft.

To ensure an efficient braking action, the retarder brake in this gearbox must have considerable size and weight which complicates the control system and increases the time required for its engagement and disengagement.

Also known in the art is a gearbox wherein the rotor is mounted on the input shaft and is connected with the output shaft by a system of gears one of which is installed on the input shaft with a provision for free rotation and can be connected with the rotor through a clutch.

However, the retarder brake in the above-mentioned gearbox is engaged only during the rotation of the input shaft of the gearbox and the engine crankshaft which are connected by engaging a friction clutch of one of the gearbox stages, and this cuts down the service life of the clutches and engine parts.

An object of the present invention is to provide a gearbox in which the aforesaid disadvantages are eliminated.

The main object of the present invention consists in providing a gearbox with a hydrodynamic retarder brake which is compact, simple in design and operation and which retarder brake is engaged directly, without the engagement of the friction clutches and rotation of the engine crankshaft.

This object is achieved by mounting the rotor on the input shaft with a provision for free rotation and connecting the rotor with a gear installed on the input shaft so that said gear can rotate on the shaft jointly with the rotor.

It is preferable that the connection between the rotor and said gear be effected by means of a bushing installed on the input shaft with provision for free rotation, said bushing being rigidly connected to the face of the rotor and carrying a rigidly fastened gear.

Such a construction of the gearbox with a hydrodynamic retarder brake reduces its size and weight, obviates the necessity for rotation of the gearbox input shaft and engine crankshaft at the braking operation and, consequently, decreases the engine wear.

Now the invention will be described in detail by way of example with reference to the accompanying drawing, the sole FIGURE of which diagrammatically shows the gearbox with a hydrodynamic retarder brake according to the invention.

The gearbox comprises a housing 1 with a stator connected thereto, an input shaft 3, an output shaft 4 with a rigidly mounted gear 5, and an intermediate shaft 6 mounting gears 7 and 8.

Free mounted on the input shaft 3 are a gear 9 and shifter sleeves 10 and 11 of the low and direct speeds, respectively, as well as a rotor 12 connected to the gear 9 through a bushing 13.

The gearbox operates in the braking operation as follows:

The output shaft 4 is rotated by a cardan shaft (omitted in the drawing) and transmits the torque to the bushing 13 and rotor 12 via the gears 5, 7, 8 and 9.

As the driver depresses the brake pedal in the cab, the oil flows from the pump (the pedal and pump are not shown in the drawing) into the working chamber 14 of the retarder brake thus producing the braking effect. As the brake pedal is released, the working chamber 14 is connected to a return line for draining the oil.

The present invention can be used in automobiles, diesel-electric locomotives and other transport vehicles.

What we claim is:

1. A gearbox for a vehicle comprising a hydrodynamic retarder brake inclusive of a rotor and a stator, an input shaft, said rotor being installed on said input shaft for free rotation thereon; an output shaft; an intermediate shaft supported for free rotation; a system of gears on said shafts connecting said rotor with said output shaft, one of said gears being installed on the input shaft for free rotation thereon and being connected to said rotor, and means for directly connecting said input and output shafts to deliver power therebetween and bypassing said system of gears, said retarder brake, when activated, exerting braking torque on said output shaft via said intermediate shaft and system of gears.

2. A gearbox according to claim 1 comprising a bushing connecting the rotor and said one gear, said bushing being installed on said input shaft for free rotation, said bushing being rigidly connected to said rotor and carrying said one gear rigidly secured thereon.

* * * * *